(12) United States Patent
Peschke et al.

(10) Patent No.: US 6,551,733 B2
(45) Date of Patent: Apr. 22, 2003

(54) CONTROLLING THE TEMPERATURE AT WHICH FUEL CELL EXHAUST IS OXIDIZED

(75) Inventors: Norm Peschke, Clifton Park, NY (US); Kenneth M. Rush, Jr., Clifton Park, NY (US)

(73) Assignee: Plug Power Inc., Latham, NY (US)

( * ) Notice: Subject to any disclaimer, the term of this patent is extended or adjusted under 35 U.S.C. 154(b) by 92 days.

(21) Appl. No.: 09/728,227

(22) Filed: Nov. 30, 2000

(65) Prior Publication Data

US 2003/0031903 A1 Feb. 13, 2003

(51) Int. Cl.[7] ............................ H01M 8/04; H01M 8/12
(52) U.S. Cl. ............................ 429/24; 429/13; 429/17
(58) Field of Search ............................ 429/13, 17, 24

(56) References Cited

U.S. PATENT DOCUMENTS

| | | | | |
|---|---|---|---|---|
| 4,943,493 A | * | 7/1990 | Vartanian | 429/17 |
| 5,330,857 A | * | 7/1994 | Sederquist et al. | 205/343 |
| 5,560,999 A | * | 10/1996 | Pedicini et al. | 429/27 |
| 6,165,633 A | * | 12/2000 | Negishi | 423/651 |
| 6,280,864 B1 | * | 8/2001 | Towler et al. | 423/651 |
| 6,370,878 B1 | * | 4/2002 | Dean et al. | 60/649 |

FOREIGN PATENT DOCUMENTS

| | | | | |
|---|---|---|---|---|
| JP | 59 051 478 A | * | 3/1984 | 429/24 |
| JP | 09 315 801 A | * | 12/1997 | |

* cited by examiner

*Primary Examiner*—Patrick Ryan
*Assistant Examiner*—Gregg Cantelmo
(74) *Attorney, Agent, or Firm*—Fish & Richardson P.C.

(57) ABSTRACT

A fuel cell system includes a fuel cell stack that generates electrical energy during operation by reacting two streams of reactant gases. The fuel cell stack also produces a fuel cell exhaust stream. An oxidizer unit is positioned to receive the fuel cell exhaust stream. The oxidizer unit oxidizes at least a part of the fuel cell exhaust stream in an oxidizing gas stream during operation. A temperature sensor is positioned to sense a temperature of the oxidizer unit and an input system provides the oxidizer unit with at least the stoichiometric amount of the oxidizing gas stream during operation. The input system controls the amount of the oxidizing gas stream in excess of the stoichiometric amount provided to the oxidizer unit in response to the temperature of the oxidizer unit.

11 Claims, 1 Drawing Sheet

CONTROLLING THE TEMPERATURE AT WHICH FUEL CELL EXHAUST IS OXIDIZED

TECHNICAL FIELD

This invention relates to tail gas oxidizer units in a fuel cell system.

BACKGROUND

Fuel cells generate electrical power by reacting two fuel gas streams with each other. One of the gas streams is referred to as an anode gas while the other is referred as a cathode gas. Certain fuel cells use a stream of gas that is rich in hydrogen as the anode gas and an air stream as the cathode gas. When the fuel cell is in use, the hydrogen in the anode gas reacts with oxygen in the cathode gas to generate electrical power. Exhaust gases exiting the fuel cell may include un-reacted fuel gases, impurities contained within the fuel gas streams, and chemical products of the reactions in the fuel cell.

Multiple fuel cells are typically arranged in a stack. Fuel cell stacks are normally part of a system, known as a fuel cell system, that includes a fuel processor or reformer for generating one of the fuel gas streams. For example, the fuel cell system that includes the fuel cell of the example above may also include a reformer that reacts a hydrocarbon, such as methane, with water to produce the hydrogen rich stream. Certain fuel cell systems also include an anode tail gas oxidizer unit (ATO) where the exhaust gases from the fuel cell are, for example, reacted with oxygen to eliminate environmentally unfriendly chemicals from the exhaust.

SUMMARY

In general one aspect of the invention relates to a fuel cell system that includes a fuel cell stack, which generates electrical energy during operation by reacting two reactant gases. The fuel cell stack also produces a fuel cell exhaust stream. An oxidizer unit is positioned to receive the fuel cell exhaust stream. The oxidizer unit oxidizes at least a part of the fuel cell exhaust stream in an oxidizing gas stream, such as air, during operation. A temperature sensor is positioned to sense a temperature of the oxidizer unit and an input system provides the oxidizer unit with at least the stoichiometric amount of the oxidizing gas stream during operation. The input system controls the amount of the oxidizing gas stream in excess of the stoichiometric amount provided to the oxidizer unit in response to the temperature of the oxidizer unit.

Embodiments of the invention may include one or more of the following features. The input system controls the amount of the oxidizing gas stream in response to the temperature of the oxidizer unit to maintain the temperature of the oxidizer unit at a target temperature. The input system includes a source, such as a blower, to provide the oxidizing gas stream, and a controller to control the amount of the oxidizing stream provided by the source in response to the temperature of the oxidizer unit. The temperature sensor generates a temperature signal corresponding to the temperature of the oxidizer unit and the controller includes a processor programmed to generate a control signal based on the temperature signal. The source provides the oxidizing gas stream in response to the control signal.

The controller stores a stoichiometric table for determining a stoichiometric amount of the oxidizing gas stream and uses the stoichiometric table when generating the control signal to direct the source to provide the oxidizer unit with at least the stoichiometric amount of the oxidizing gas stream. A meter measures an amount of electrical power generated by the system and generates a corresponding load signal. The stoichiometric table relates the load signal to a blower control signal that causes the blower to provide the oxidizer unit with the stoichiometric amount of the oxidizing gas stream. The controller uses the load signal and the stoichiometric table when generating the control signal to direct the source to provide the oxidizer unit with at least the stoichiometric amount of the oxidizing gas stream.

In general, another general aspect of the invention relates to a method that includes generating electrical energy in a fuel cell stack by reacting two reactant gas streams to produce a fuel cell exhaust stream, oxidizing at least a part of the fuel cell exhaust stream using an oxidizing gas stream in an oxidizer unit, sensing a temperature of the oxidizer unit, providing the oxidizer unit with at least the stoichiometric amount of the oxidizing gas stream, and controlling the amount of the oxidizing gas stream in excess of the stoichiometric amount provided to the oxidizer unit in response to the temperature of the oxidizer unit.

Embodiments of the aspect of the invention may include one or more of the following features. The amount of the oxidizing gas stream is controlled in response to the temperature of the oxidizer unit to maintain the temperature of the oxidizer unit at a target temperature. A temperature signal corresponding to the temperature of the oxidizer unit is generated and a control signal is generated based on the temperature signal. The oxidizing stream is provided in response to the control signal.

A stoichiometric table for determining a stoichiometric amount of the oxidizing gas stream is stored and used when generating the control signal to provide the oxidizer unit with at least the stoichiometric amount of the oxidizing gas stream. An amount of electrical power generated by the system is measured and a load signal corresponding to the amount of electrical power is generated. The stoichiometric table relates the load signal to the stoichiometric amount of the oxidizing gas stream and the control signal is generated based on the load signal and stoichiometric table to provide the oxidizer unit with at least the stoichiometric amount of the oxidizing gas stream.

Among other advantages, controlling the temperature of the anode tail gas oxidizer unit by, for example, maintaining the temperature at a target operating temperature controls the amounts of environmentally unfriendly chemicals in the oxidizer unit exhaust. Thus, the invention can be used to keep the amounts of environmentally unfriendly chemicals in the oxidizer exhaustbelow a threshold value.

The details of one or more embodiments of the invention are set forth in the accompanying drawing and the description below. Other features, objects, and advantages of the invention will be apparent from the description and drawing, and from the claims.

DETAILED DESCRIPTION

Figure 1:
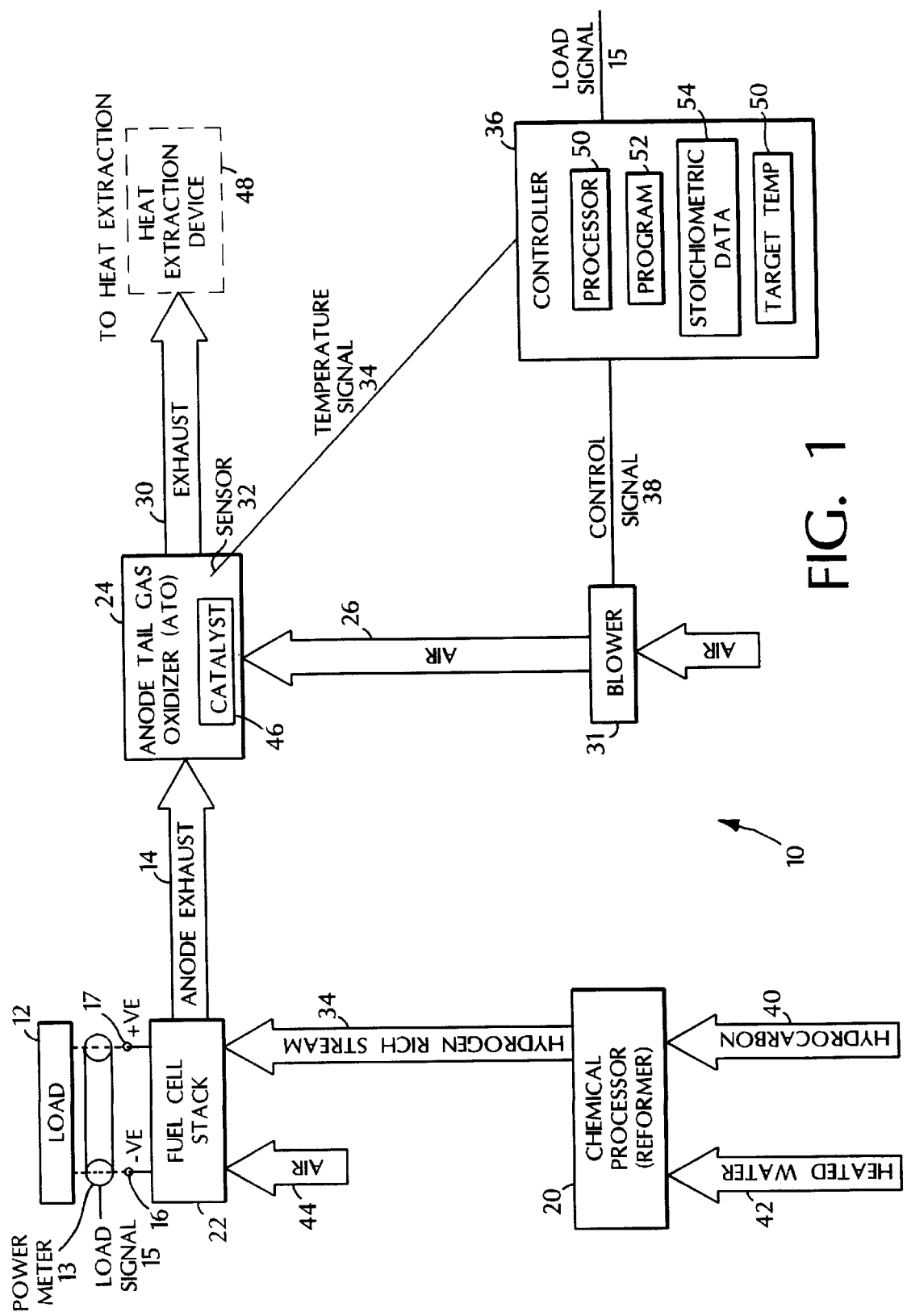
FIG. 1 is a block diagram of a fuel cell system.

As shown in FIG. 1, a fuel cell system 10 for supplying electrical energy to a load 12 has a negative electrical terminal 16 and a positive electrical terminal 17 for connecting to corresponding terminals of the load. Load 12 typically includes a power conditioning system and a circuit to which electrical appliances and/or equipment are connected. When fuel cell system 10 is in use, it delivers electrical energy to load 12 by generating a potential difference between terminals 16 and 17. A power meter 13 measures the rate at which electrical energy is delivered to the load 12 ("electrical power") and generates a load signal 15 that corresponds to the measured electrical power.

Fuel cell system 10 includes a fuel cell stack 22 that generates the electrical energy using a hydrogen-rich gas stream 34 produced by a reformer 20. Fuel cell stack 22 also produces anode exhaust 14, which contains residual amounts hydrogen gas from the hydrogen rich stream 34 and hydrocarbons from reformer 20. An anode tail gas oxidizer unit 24 promotes an oxidation reaction between components of the anode exhaust 14 and air 26 to produce oxidizer exhaust 30. Air 26 may be referred to as the ATO oxidizing stream. An air blower 31 provides the air 26 to the anode tail gas oxidizer unit 24. At least a portion of the air 26 may also come from the fuel cell cathode exhaust from air stream 44. Other ATO oxidant sources are possible. A temperature sensor 32, such as a thermocouple, senses the temperature within the anode tail gas oxidizer unit 24 and generates a temperature signal 34. A controller 36, which generates a control signal 38, controls how much air 26 the blower 31 provides to anode tail gas oxidizer unit 24. Controller 36 controls blower 31 to provide air 26 in excess of the amount needed to oxidize the hydrocarbons and hydrogen in anode exhaust 14. Controller 36 controls the temperature of anode exhaust 14 by controlling the amount of air 26 that is flowed into the anode tail gas oxidizer unit 24. Increasing the flow of air 26 into the anode tail gas oxidizer unit 24 beyond the stoichiometric amount tends to lower the temperature of the unit 24 by carrying heat away from the oxidizer unit 24.

A reformer 20 reacts a hydrocarbon 40, such as methane, with steam 42 and oxygen 43 to generate a hydrogen-rich stream of gas 34, which, for example, contains about thirty percent hydrogen gas. Since the reformer 20 is not completely efficient at converting the hydrocarbon into hydrogen, the hydrogen rich stream 34 also contains residual amounts of the hydrocarbon 40. Typically, more than two percent of the hydrogen rich stream 34 is composed of residual hydrocarbons. The hydrogen rich stream 34 may also contain residual amounts of carbon monoxide, 30 ppm for example.

Fuel cell stack 22 is, for example, a stack of proton exchange membrane fuel cells, each of which reacts some of hydrogen-rich stream 32 (anode gas) with a stream of air 44 (cathode gas) to generate the electrical energy. The reaction in the fuel cell stack 22 also produces anode exhaust 14. Anode exhaust 40 contains residual amounts of un-reacted hydrogen from the hydrogen rich stream 34 in addition to the previously described residual amounts of the hydrocarbons 36. For example, anode exhaust 40 may contain ten percent or more un-reacted hydrogen gas.

Anode tail gas oxidizer unit 24 exposes anode exhaust 14 from fuel cell stack 22 to air 26 in the presence of a catalyst 46, such as a platinum or a palladium matrix, which promotes oxidation and produces oxidizer exhaust 30. If the oxidation process occurs at temperatures that are too high (e.g., over 800° C.), it produces undesirable products that are harmful if released to the environment. Oxidation at even greater temperatures may result in damage to the ATO catalyst (by sintering, for example). On the other hand, if the oxidation process occurs at lower temperatures, more benign oxidation products are produced. The catalyst allows the exhaust 14 to be oxidized at lower temperatures than would be possible in alternate oxidation apparatus, such as a flame combustion system. However, if temperature of the catalyst is too low (e.g., below 500° C.), the catalyst may not effectively oxidize the hydrocarbons and the hydrogen in anode exhaust 14. Anode tail gas oxidizer unit 24 typically operates at a temperature between 500° C. and 800° C. The oxidation process generates heat, thereby raising the temperature of oxidizer exhaust 30. The oxidizer exhaust 30 may be directed to a heat extraction device 48 that extracts heat from the exhaust 30, for example, for use in a component of the fuel cell system 10, such as reformer 20.

The amount of heat produced in the anode tail gas oxidizer unit 24 depends on the amount of air 26 provided by the blower 31. For example, if the blower 31 does not provide enough air to oxidize all of the un-oxidized hydrocarbons and hydrogen in the anode exhaust 14, only part of the exhaust 14 is oxidized yielding only part of the heating value of the exhaust. As the blower 31 provides more air 26, more of the anode exhaust 14 is oxidized yielding more of the heating value of the exhaust 14 and resulting in a higher temperature in the anode tail gas oxidizer unit 24. There is a certain amount of air 26, known as the stoichiometric amount that is theoretically just enough to oxidize all of the oxidizable components of anode exhaust 14. When the blower 31 provides the stoichiometric amount of air 26, the anode tail gas oxidizer unit 24 yields a maximum amount of energy, resulting in a maximum temperature within the oxidizer unit 24.

As the blower 31 provides air 26 in excess of the stoichiometric amount, the heat produced by the anode tail gas oxidizer unit 24 remains constant because the additional air does not oxidize any further components of the anode exhaust 14. However, since the excess air is cooler than the temperature of the oxidizer unit 24, some of the heat produced in the anode tail gas oxidizer unit 24 heats the excess air and is carried away, thereby lowering the temperature of anode tail gas oxidizer unit 24 and catalyst 44. Thus, providing excess amounts of air 26 to the oxidizer unit 24 lowers the temperature in the oxidizer unit 24.

Controller 36 stores a program 52, a target temperature of the catalyst 44, and a stoichiometric table 54 relating the load signal 15 to a control signal 38 required to cause the blower 31 to provide the stoichiometric amount of air 26 to anode tail gas oxidizer unit 24. Controller 36 includes a processor 50, which executes program 52 to generate the control signal 38 that controls how much air blower 31 provides to the anode tail gas oxidizer unit 24. Controller 36 uses stoichiometric table 54, load signal 15 and temperature signal 34 from sensor 32 positioned within the anode tail gas oxidizer unit to determine the amount of air 26 in excess of the stoichiometric amount that blower 31 should provide to anode tail gas oxidizer unit 24 to achieve the target temperature.

The data in stoichiometric table 54 are obtained during calibration tests that are performed before the fuel cell is deployed. During the calibration tests, the fuel cell stack 22 is operated at different power loads and samples of anode exhaust 14 are collected for each value of the load signal 15 measured by power meter 13. Each of the samples is analyzed in a gas chromatograph to determine the amounts of hydrocarbons and hydrogen in the sample. Based on the amount of hydrocarbons and hydrogen in the samples, the stoichiometric amount of air is determined. Knowing the stoichiometric amount of air that must be introduced into the oxidizer unit 24, the speed of the blower 31 and the control signal 38 required to establish that speed are determined. Corresponding values of the load signal 15 and the control signal 38 are tabulated in stoichiometric table 54.

During operation, the processor 50 uses the load signal 15 and stoichiometric table 54 to look-up the stoichiometric control signal 38, which drives the blower to provide the stoichiometric amount of air. Processor 50 also monitors the temperature signal 34, which indicates the temperature within the anode tail gas oxidizer unit 24, and compares that temperature with the target temperature 56 of the catalyst 46. Typically, the temperature within anode tail gas oxidizer unit 24 will be higher than the target temperature 56 when blower 51 provides the stoichiometric amount of air. To lower the temperature within the oxidizer unit 24 to the target temperature 56, processor 50 drives the blower 31 to provide air 26 in excess of the stoichiometric amount. The excess air carries heat out of the anode tail gas oxidizer unit 24, thereby lowering the temperature within the oxidizer unit.

Processor 50 controls the amount of excess air provided by blower 31 based on the difference between the target temperature 56 and the temperature within the anode tail gas oxidizer unit 24. In this way, processor 50 controls blower 31 to maintain the temperature within anode tail gas oxidizer unit 24 at the target temperature. The invention may also be implemented in other embodiments having other control arrangements and hardware and software configurations. For example, in a simplified form, the invention may be implemented as a simple feedback loop between the ATO temperature and the oxidizing gas supply.

It will be understood that various modifications may be made to the embodiment described above without departing from the spirit and scope of the invention. For example, though we have described a hydrogen/oxygen fuel cell, the ideas presented here have applicability to other fuel cell systems.

Accordingly, other embodiments are within the scope of the following claims.

What is claimed is:

1. A fuel cell system comprising:
   a fuel cell stack which generates electrical energy during operation by reacting two streams of reactant gases, the fuel cell stack also producing a fuel cell exhaust stream;
   an oxidizer unit positioned to receive the fuel cell exhaust stream, the oxidizer unit oxidizing at least a part of the fuel cell exhaust stream in an oxidizing gas stream during operation;
   a temperature sensor positioned to sense a temperature of the oxidizer unit; and
   an input system to provide the oxidizer unit with an amount of the oxidizing gas stream in excess of a stoichiometric amount required to oxidize the part of the fuel cell exhaust stream, the input system responding to the temperature of the oxidizing unit by controlling the amount of oxidizing gas provided to achieve a desired difference between the provided amount of the oxidizing gas stream and the stoichiometric amount,
   a source to provide the oxidizing gas stream; and
   a controller to control the amount of the oxidizing gas stream provided by the source in response to the temperature of the oxidizer unit;
   wherein the controller stores a stoichiometric table for determining a stoichiometric amount of the oxidizing gas stream, and the controller uses the stoichiometric table when generating the control signal to direct the source to provide the oxidizer unit with the excess of the stoichiometric amount of the oxidizing gas stream.

2. The fuel cell system of claim 1 wherein the input system controls the amount of the oxidizing gas stream in response to the temperature of the oxidizer unit to maintain the temperature of the oxidizer unit at a target temperature.

3. The fuel cell system of claim 1 wherein:
   the temperature sensor generates a temperature signal corresponding to the temperature of the oxidizer unit;
   the controller includes a processor programmed to generate a control signal based on the temperature signal; and
   the source provides the oxidizing gas stream in response to the control signal.

4. The fuel cell system of claim 1 further comprising:
   a meter to measure an amount of electrical power generated by the system, the meter generating a load signal corresponding to the amount of electrical power;
   wherein:
   the stoichiometric table relates the load signal to the stoichiometric amount of the oxidizing gas stream, and the controller uses the load signal and stoichiometric table when generating the control signal to direct the source to provide the oxidizer unit with at least the stoichiometric amount of the oxidizing gas stream.

5. The fuel cell system of claim 1 wherein the source is a blower.

6. The fuel cell system of claim 1 wherein the oxidizing gas stream is an air stream.

7. A method comprising:
   generating electrical energy in a fuel cell stack by reacting two streams of reactant gases to produce a fuel cell exhaust stream;
   oxidizing at least a part of the fuel cell exhaust stream using a oxidizing gas stream in an oxidizer unit;
   sensing a temperature of the oxidizer unit;
   providing the oxidizer unit with an amount of the oxidizing gas stream in excess of a stoichiometric amount required to oxidize the part of the fuel cell exhaust stream during operation; and
   responding to the sensed temperature by controlling the amount of oxidizing gas provided to achieve a desired difference between the provided amount of the oxidizing gas stream and the stoichiometric amount, wherein controlling the amount of oxidizing gas provided includes:
   storing a stoichiometric table for determining a stoichiometric amount of the oxidizing gas stream; and
   using the stoichiometric table when generating the control signal to provide the oxidizer unit with the excess of the stoichiometric amount of the oxidizing gas stream.

8. The method of claim 7 further comprising:
   controlling the amount of the oxidizing gas stream in response to the temperature of the oxidizer unit to maintain the temperature of the oxidizer unit at a target temperature.

9. The method of claim 7 further comprising:
   generating a temperature signal corresponding to the temperature of the oxidizer unit;
   generating a control signal based on the temperature signal; and
   providing the oxidizing gas stream in response to the control signal.

10. The method of claim 7 further comprising:
    measuring an amount of electrical power generated by the system;
    generating a load signal corresponding to the amount of electrical power, wherein
    the stoichiometric table relates the load signal to the stoichiometric amount of the oxidizing gas stream; and generating the control signal based on the load signal and stoichiometric table to provide the oxidizer unit with at least the stoichiometric amount of the oxidizing gas stream.

11. The method of claim 7 wherein the oxidizing gas stream is an air stream.

* * * * *